US009323975B2

(12) United States Patent
Riedijk et al.

(10) Patent No.: US 9,323,975 B2
(45) Date of Patent: Apr. 26, 2016

(54) FINGERPRINT SENSING SYSTEM AND METHOD

(71) Applicant: FINGERPRINT CARDS AB, Gothenburg (SE)

(72) Inventors: Frank Robert Riedijk, Delft (NL); Hans Thornblom, Kungsbacka (SE)

(73) Assignee: FINGERPRINT CARDS AB, Göteborg (SE)

( * ) Notice: Subject to any disclaimer, the term of this patent is extended or adjusted under 35 U.S.C. 154(b) by 33 days.

(21) Appl. No.: 14/566,175

(22) Filed: Dec. 10, 2014

(65) Prior Publication Data

US 2015/0169932 A1 Jun. 18, 2015

(30) Foreign Application Priority Data

Dec. 12, 2013 (SE) ...................................... 1351489

(51) Int. Cl.
*G06K 9/00* (2006.01)
(52) U.S. Cl.
CPC .............. *G06K 9/001* (2013.01); *G06K 9/0002* (2013.01); *G06K 9/00013* (2013.01)
(58) Field of Classification Search
CPC .............................. G06K 9/0002; G06K 9/001
USPC .......................................................... 348/77
See application file for complete search history.

(56) References Cited

U.S. PATENT DOCUMENTS 5,077,803 A * 12/1991 Kato ..................... A61B 5/1172
356/71
7,864,992 B2 1/2011 Riedijk et al.
9,152,841 B1 * 10/2015 Riedijk ................. G06K 9/0002
2002/0122026 A1 * 9/2002 Bergstrom .......... G06F 3/03547
345/157
2004/0239549 A1 * 12/2004 Morgan ................ G01S 7/4802
342/25 R (Continued)

FOREIGN PATENT DOCUMENTS

| EP | 1624412 A1 | 2/2006 |
| EP | 2184700 A2 | 5/2010 |
| WO | 03049011 A1 | 6/2003 |

OTHER PUBLICATIONS

Kim, S. et al., "A CMOS Fingerprint System-on-a-Chip With Adaptable Pixel Networks and Column-Parallel Processors for Image Enhancement and Recognition," IEEE Journal of Solid-State Circuits, vol. 43, No. 11, Nov. 2008, pp. 2558-2567.

(Continued)

*Primary Examiner* — Behrooz Senfi
(74) *Attorney, Agent, or Firm* — Remarck Law Group PLC

(57) ABSTRACT

The present invention relates to a method of determining a representation of a fingerprint pattern. The method comprises the steps of acquiring a reference signal indicative of an electric coupling between a hand surface having friction ridges and a reference sensing structure extending across a plurality of the friction ridges; and determining the representation of the fingerprint pattern based on the reference signal and a capacitive coupling between the finger and each of a plurality of sensing elements. The acquired reference signal can, for example, be used for controlling the sensing elements so that the sensing performed by the sensing elements is carried out using favorable timing, when the signal quality is good. Alternatively, or in combination, the acquired reference signal may be used for post-processing, whereby the signals/signal values obtained by the sensing elements are modified depending on the corresponding values of the reference signal.

14 Claims, 8 Drawing Sheets

(56) References Cited

U.S. PATENT DOCUMENTS

| | | |
|---|---|---|
| 2006/0049834 A1 | 3/2006 | Umeda |
| 2007/0031011 A1 | 2/2007 | Erhart et al. |
| 2008/0069413 A1 | 3/2008 | Riedijk et al. |
| 2010/0084542 A1 | 4/2010 | Chou |
| 2013/0279769 A1 | 10/2013 | Benkley et al. |

OTHER PUBLICATIONS

PCT International Search Report and Written Opinion dated May 26, 2015 for PCT International Application No. PCT/SE2014/051483, 12 pages.

* cited by examiner

FINGERPRINT SENSING SYSTEM AND METHOD

CROSS-REFERENCE TO RELATED APPLICATIONS

This application claims the benefit of Swedish Patent Application No. 1351489-8, filed Dec. 12, 2013. The disclosure of the above application is incorporated herein by reference in its entirety.

FIELD OF THE INVENTION

The present invention relates to a fingerprint sensing system and to a method of determining a representation of a fingerprint pattern.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

Among the various available fingerprint sensing principles (such as capacitive, optical, thermal etc.), capacitive sensing is most commonly used, in particular in applications where size and power consumption are important issues.

All capacitive fingerprint sensors provide a measure indicative of the capacitance between several sensing structures and a finger placed on or moved across the surface of the fingerprint sensor.

Some capacitive fingerprint sensors passively read out the capacitance between the sensing structures and the finger. This, however, requires a relatively large capacitance. Therefore such passive capacitive sensors are typically provided with a very thin protective layer covering the sensing structures, which makes such sensors rather sensitive to scratching and/or ESD (electro-static discharge).

U.S. Pat. No. 7,864,992 discloses a fingerprint sensing system in which a driving signal is injected into the finger by pulsing a conductive structure arranged in the vicinity of the sensor array and measuring the resulting change of the charge carried by the sensing structures in the sensor array.

Although the fingerprint sensing system according to U.S. Pat. No. 7,864,992 provides for an excellent combination of fingerprint image quality and sensor protection, there appears to be room for improvement for "difficult" fingers, in particular for dry fingers.

SUMMARY

In view of above-mentioned and other drawbacks of the prior art, it is an object of the present invention to provide an improved fingerprint sensing system, in particular providing for improved sensing of fingerprints from "difficult" fingers, such as dry fingers. Additionally, the present inventors have found that interference, such as high frequency components of common mode noise originating from switched power supply devices, may influence the fingerprint sensing performance of a fingerprint sensing system. It is thus a further object to provide for fingerprint sensing that is more robust in view of at least some types of electrical interference.

According to a first aspect of the present invention, it is therefore provided a method of determining a representation of a fingerprint pattern of a finger using a fingerprint sensor comprising a plurality of sensing elements, the method comprising the steps of acquiring a reference signal indicative of an electric coupling between a hand surface having friction ridges and a reference sensing structure configured in such a way that at least a portion of the reference sensing structure faces one of the friction ridges; and determining the representation of the fingerprint pattern based on the reference signal and a capacitive coupling between the finger and each of the sensing elements.

The reference sensing structure may be any structure that is arranged to electrically couple to a hand surface having friction ridges, such as a finger surface or a palm surface, and that is configured in such a way that at least a portion of the reference sensing structure faces one of the friction ridges of the hand surface, regardless of the exact hand placement. This may, for example, be achieved by configuring the reference sensing structure as an integral structure that is sufficiently large to cover a plurality of friction ridges of the hand surface. Alternatively, the reference sensing structure may be a distributed structure comprising a plurality of sub-structures arranged randomly or in a pattern so as to ensure that at least one of the sub-structures will be facing one of the friction ridges of the hand surface regardless of the position of the hand surface. This may be ensured by selecting a sufficiently large number of sub-structures and/or selecting a suitable spacing in relation to typical dimensions of the friction ridges. In this context it should be noted that a typical distance between adjacent friction ridges for an adult is around 200-300 µm.

In embodiments of the present invention, the reference sensing structure may be the sensing structure (such as a metal plate) comprised in a single sensing element, if it has been determined that this particular sensing structure is arranged in such a way that a signal indicative of the capacitive coupling between the finger and the sensing structure can be acquired.

By "facing" a friction ridge, should be understood being arranged opposite a friction ridge arranged in contact with the reference sensing structure or dielectric layer covering the reference sensing structure.

The reference sensing structure may be included in a fingerprint sensor component, or may be provided outside the fingerprint sensor component.

The representation of the fingerprint pattern may, for example, be raw fingerprint image data, or the data may have been processed and may then be provided in the form of conditioned image data, as fingerprint template data or in any other form.

The present invention is based upon the realization that a reference sensing structure configured to face at least one friction ridge can be used to obtain a reliable indication of the quality of the signal on the finger surface.

For instance, the reference sensing structure may advantageously extend across a plurality of friction ridges, whereby the signal becomes a kind of average signal for the finger surface that indicates the finger condition (dry or wet) and/or the quality of an excitation signal provided to the finger.

The acquired reference signal can, for example, be used for controlling the sensing elements so that the sensing performed by the sensing elements is carried out using favorable timing, when the signal quality is good. Alternatively, or in combination, the acquired reference signal may be used for post-processing, whereby the signals/signal values obtained by the sensing elements are modified depending on the corresponding values of the reference signal.

Accordingly, embodiments of the present invention provide for an improved determination of a fingerprint pattern, in particular in difficult measurement conditions. Such difficult measurement conditions may, for example, result from particularly dry/wet fingers and/or external interference, such as common mode noise.

According to various embodiments of the present invention, the step of determining may comprise the steps of acquiring pixel signals indicative of the capacitive coupling between the finger and each of the sensing elements using acquisition settings being dependent on the reference signal; and determining the representation of the fingerprint pattern based on the pixel signals.

By the term "acquisition settings" should be understood any parameter or set of parameters used when acquiring the pixel signals, including, in particular, the timing of the acquisition of pixel signals from the different sensing elements.

In these embodiments, the acquisition of the pixel signals can take place at times when the signal conditions are favorable and/or the acquisition can be carried out in such a way that the dynamic range of the sensing elements is used in a favorable way. For instance, one or several sensing elements may be controlled to use a relatively long time for acquisition when the reference signal is weak and a relatively short time when the reference signal is strong.

In various embodiments, the step of acquiring the pixel signals may comprise the steps of: sampling the reference signal at a sampling time, resulting in a reference signal value; sampling at least one pixel signal from at least one of the sensing elements at the sampling time, resulting in at least one pixel signal value; and resampling, if the reference signal value is outside a reference signal value range, the at least one pixel signal at a later sampling time.

In these embodiments, each sampled reference signal value is used as an indication of the quality of the pixel signal value(s) that is/are sampled at the same sampling time. If the signal acquisition conditions are unfavorable at a certain sampling time, for example due to high frequency common mode noise, then any pixel signal values sampled at that sampling time may be discarded and the relevant sensing elements may be resampled.

Depending on the disturbance signal, such as common mode noise, affecting the potential difference between the hand surface and the reference structure, the reference signal value may, at a given acquisition time, be either lower or higher than expected for a situation without high frequency disturbance components.

For example, the reference signal values, as well as the pixel signal values, may advantageously be determined using the difference between a first sample and a second sample, so-called correlated double sampling. In such a case, a high frequency disturbance signal occurring between the first sample and the second sample may result in either a very low signal value or a very high signal value. In either case, the resulting pixel signal value will not correctly reflect the capacitive coupling, and hence the distance, between the sensing element and the finger surface.

Accordingly, the reference signal value range may advantageously be dimensioned in such a way that pixel signal values that are outside of what could be expected are resampled. For instance, the reference signal value range may correspond to a known range of different finger conditions and common mode noise without high frequency components/a disturbance-free condition.

To reduce energy consumption, discarded samples may be prevented from proceeding to be converted from analog form to digital form.

Hence, the method may further comprise the step of converting, only if the reference signal value is inside the reference signal value range, the at least one pixel signal value from analog to digital.

Alternatively, or in combination, any other or additional continued processing of the sampled pixel signal values may be allowed only if the reference signal value is inside the reference signal value range.

According to various embodiments, furthermore, the step of acquiring the pixel signals may comprise the step of sampling the reference signal at a series of sampling times, resulting in a series of reference signal values; and sampling the pixel signal at the series of sampling times, resulting in a series of pixel signal values, wherein the representation of the fingerprint pattern is determined based on the series of reference signal values and the series of pixel signal values.

In case of no disturbances affecting the acquisition of the pixel signals, or if disturbances do not have any high frequency components, all reference signal values in the series of reference signal values should be substantially the same. If high frequency disturbances are present, however, sampling may coincide with a rapid change in the finger potential, resulting in one or several incorrect pixel signal value(s). The series of reference signal values can, however, be used to compensate for this incorrectness.

Consider a particular sampling time. If a reference signal sampled at this sampling time is lower than average, then the pixel signal value(s) sampled at this sampling time may be modified to a higher value, and if the reference signal sampled at this sampling time is higher than average, then the pixel signal value(s) sampled at this sampling time may be modified to a lower value.

The method may thus advantageously further comprise the step of: modifying the series of pixel signal values using the series of reference signal values to provide a modified series of pixel signal values, wherein the representation of the fingerprint pattern is determined based on the modified series of pixel signal values.

A reference signal value resulting from sampling of the reference signal at a given sampling time may thus advantageously be used for modifying the pixel signal value resulting from sampling of the pixel signal from a particular sensing element at the same given sampling time.

Moreover, the reference signal sampled at the given sampling time may be provided from a reference sensing structure comprising a plurality of sensing structures including the above-mentioned particular sensing element.

This modification, or post-processing may be carried out on analog or digital signals, and may be performed on the fingerprint sensor component or outside the fingerprint sensor component, such as in a host processor in a mobile phone or computer etc.

In addition, the method according to various embodiments of the present invention may further comprise the step of providing an excitation signal in the form of a time-varying potential to the finger. Any sampling of the reference signal and the pixel signals may be synchronized with this excitation signal. In some embodiments, the excitation signal may have a given frequency, and in other embodiments, the excitation signal may be controllable to provide a positive or negative flank at times when disturbance is low (this can be monitored using the reference sensing structure).

As an alternative or complement to providing the excitation signal, suitable flanks in the disturbance signal can be used as excitation signals.

According to various embodiments of the present invention, the step of acquiring may comprise the steps of evaluating the reference signal; and sampling a pixel signal from each of the sensing elements using sampling timing being dependent on the evaluation of the reference signal.

In these embodiments, the sampling itself may be made dependent on the coupling between the reference signal and the hand surface. If the electric (typically capacitive) coupling between the reference sensing structure and the hand surface is strong, then the reference signal will reach a given reference signal value faster than if the coupling is weak. According to the present embodiments of the invention, this phenomenon is used to decide the timing for sampling the pixel signals from the sensing elements so as to normalize the pixel signal values. This will provide for improved use of the dynamic range of the sensing elements and read-out circuitry in the fingerprint sensing system.

Furthermore, the step of sampling may advantageously comprise the steps of performing a first sampling at a first sampling time; and performing a second sampling at a second sampling time later than the first sampling time, and a time period between the first sampling time and the second sampling time may be determined based on the reference signal.

According to a second aspect of the present invention, there is provided a fingerprint sensing system for determining a representation of a fingerprint pattern of a finger, the fingerprint sensing system comprising: a plurality of sensing elements each being configured to capacitively couple to a finger arranged adjacent to the sensing element; a reference sensing structure being configured in such a way that at least a portion of the reference sensing structure faces one of the friction ridges when a hand surface having the friction ridges is arranged adjacent to the reference sensing structure; read-out circuitry connectable to the reference sensing structure and configured to acquire a reference signal indicative of an electric coupling between the hand surface and the reference sensing structure; and fingerprint determining circuitry configured to determine the representation of the fingerprint pattern based on the reference signal and a capacitive coupling between the finger and each of the sensing elements.

To provide for averaging of the finger/hand topology for different potential users, the reference sensing structure may advantageously be dimensioned to extend across a plurality of the friction ridges. For instance, the reference sensing structure may have a lateral extension of at least 200 µm, or even more advantageously at least 300 µm.

According to embodiments of the fingerprint sensing system, the reference sensing structure may comprise a plurality of the sensing elements.

Such sensing elements may advantageously be interconnectable to act as a single conductive structure. For instance, the read-out circuitry may be controllable to interconnect selected sensing elements and to acquire the reference signal from those selected sensing elements.

It should be noted that the reference sensing structure need not necessarily be fixed in position and/or configuration, but could be differently configured at different times. For instance, in embodiments where a plurality of sensing elements are configured to together form the reference sensing structure, the reference sensing structure may be formed by different groups at different times during acquisition of the above-mentioned representation of the fingerprint pattern.

Advantageously, the reference signal from a reference sensing structure comprising a given sensing structure may be used for modifying the pixel value obtained by sampling the pixel signal from that sensing structure.

Moreover, the fingerprint sensing system according to embodiments of the present invention may further comprise evaluation circuitry connectable to the read-out circuitry and configured to evaluate at least one property of the reference signal; and sampling circuitry connectable to each of the sensing elements and to the evaluation circuitry, the sampling circuitry being configured to sample a pixel signal from each of the sensing elements using sampling timing being dependent on the evaluation of the reference signal.

Furthermore, the fingerprint sensing system may advantageously comprise driving circuitry configured to provide the above-mentioned excitation signal to the finger. The excitation signal may be provided to the finger through a finger driving structure. In various embodiments, the reference sensing structure may function as the finger driving structure.

According to various embodiments, the fingerprint sensing system may further comprise a communication interface for providing the determined representation of the fingerprint pattern to another device or system. The communication interface may be any suitable communication interface, which may be a parallel interface or a serial interface. One example of a suitable communication interface may be the SPI-interface (Serial Peripheral Interface).

Moreover, the fingerprint sensing system according to embodiments of the present invention may be comprised in a fingerprint verification arrangement included in an electronic device. The electronic device may further comprise processing circuitry configured to control the fingerprint verification arrangement to carry out a fingerprint verification of a user, and to perform at least one user-requested process only if the user is verified using the fingerprint verification arrangement.

Further embodiments of, and effects obtained through this second aspect of the present invention are largely analogous to those described above for the first aspect of the invention.

In summary, the present invention relates to a method of determining a representation of a fingerprint pattern. The method comprises the steps of acquiring a reference signal indicative of an electric coupling between a hand surface having friction ridges and a reference sensing structure extending across a plurality of the friction ridges; and determining the representation of the fingerprint pattern based on the reference signal and a capacitive coupling between the finger and each of a plurality of sensing elements. The acquired reference signal can, for example, be used for controlling the sensing elements so that the sensing performed by the sensing elements is carried out using favorable timing, when the signal quality is good. Alternatively, or in combination, the acquired reference signal may be used for post-processing, whereby the signals/signal values obtained by the sensing elements are modified depending on the corresponding values of the reference signal.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the fingerprint sensing system and method according to the present invention are mainly discussed with reference to a fingerprint sensing system in which the reference sensing structure is included in the fingerprint sensor component package.

It should be noted that this by no means limits the scope of the present invention, which equally well includes, for example, a fingerprint sensing system in which the reference sensing structure is arranged at a separate location that is expected to contact a finger or palm of the user using the fingerprint sensing system.

Figure 1:
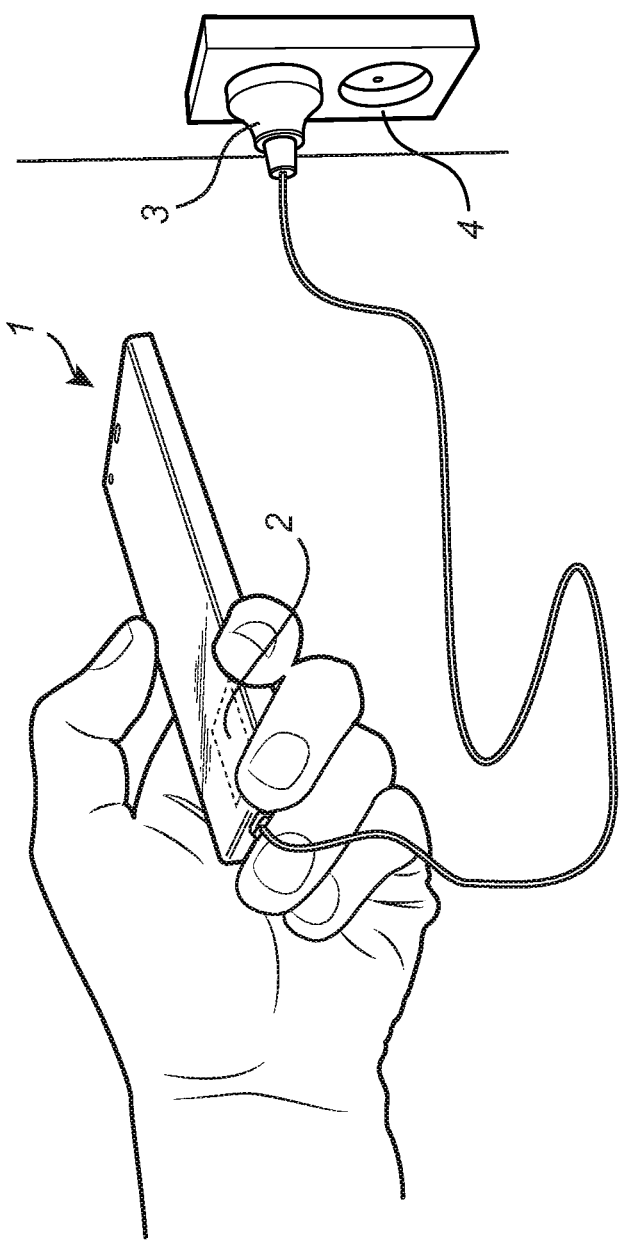
FIG. 1 schematically illustrates an application for a fingerprint sensing system according to an example embodiment of the present invention.

FIG. 1 schematically illustrates an example application for a fingerprint sensing system according to embodiments of the present invention, in the form of a mobile phone 1 with an integrated fingerprint sensing system 2. The fingerprint sensing system 2 may, for example, be used for unlocking the mobile phone 1 and/or for authorizing transactions carried out using the mobile phone etc.

As is shown in FIG. 1, the mobile phone 1 is being charged using a charger 3 connected to an AC power socket 4.

The charging of the phone may introduce common-mode noise (CMN) that makes the mobile phone 1 follow the electric potential of the common-mode noise—the mobile phone 1 will "bounce up and down" electrically.

The common-mode noise will, from the perspective of the mobile phone 1, cause the user to appear electrically noisy. This may influence uses of the mobile phone 1 that rely upon an evaluation of the potential difference between the mobile phone 1 and the user. Such uses include, for example, use of a capacitive touchscreen and use of the fingerprint sensing system 2.

Figure 2:
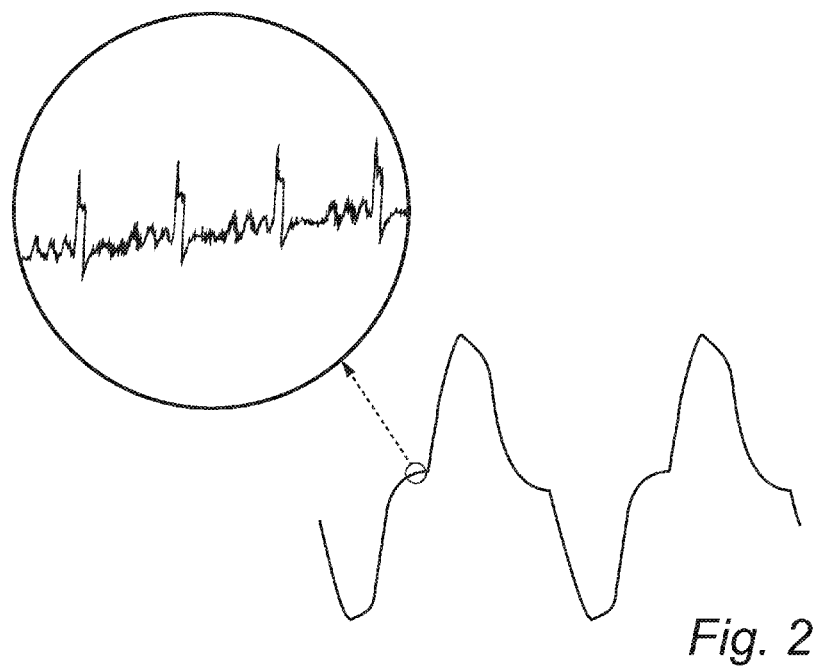
FIG. 2 is a representative illustration of common-mode noise from a switched power supply.

FIG. 2 is a representative illustration of the common-mode noise from the charger 3 in FIG. 1. As can be seen in FIG. 2, the common-mode noise has a low frequency component (50/60 Hz depending on the AC power frequency) with a relatively high amplitude, and a high frequency switchmode component (the enlarged part of FIG. 2) with a lower amplitude. In particular the high frequency component of the common-mode noise can cause problems for a fingerprint sensing system. In the following, it will be described how various embodiments of the present invention at least partly mitigate such problems.

First, two embodiments of the fingerprint system according to the present invention—one touch sensor based system and one swipe sensor based system—will be described with reference to FIGS. 3a-b.

Figure 3A:
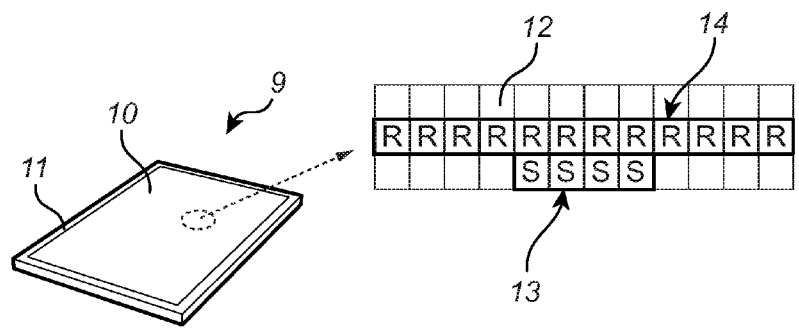
FIG. 3a schematically shows a first embodiment of the fingerprint sensing system according to the present invention.

FIG. 3a schematically shows a touch sensor based fingerprint sensing system, in the form of packaged touch sensor component 9 comprising a sensor array 10 and a conductive bezel or frame 11 for providing an excitation signal to the finger of the user. Although not explicitly shown in FIG. 3a, the sensor component 9 also comprises a power supply interface and a communication interface.

The sensor array 10 comprises a large number of sensing elements, 12 (only one of the sensing elements has been indicated with a reference numeral to avoid cluttering the drawing), each being controllable to sense a distance between a sensing structure (top plate) comprised in the sensing element 12 and the surface of a finger contacting the top surface of the sensor array 10. In the enlarged portion of the sensor array 10 in FIG. 3a, a first group 13 of sensing elements are marked 'S' for sensing, and a second group 14 of sensing elements are marked 'R'. The sensing elements in the second group 14 together form a reference sensing structure that has as sufficiently large lateral extension to extend across several friction ridges of the user's finger. For example, the pitch of the sensor array 10 may be 500 sensing elements per inch, which means that the width of the exemplary reference sensing structure 14 in FIG. 3a is about 0.6 mm.

Figure 3B:
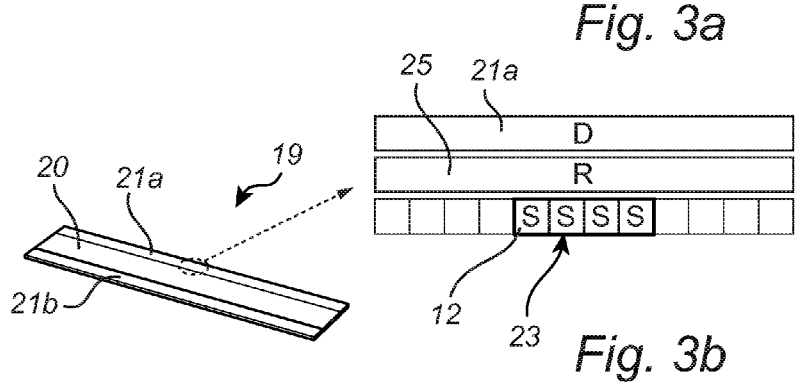
FIG. 3b schematically shows a second embodiment of the fingerprint sensing system according to the present invention.

FIG. 3b schematically shows a swipe sensor based fingerprint sensing system, in the form of packaged swipe sensor component 19 comprising a sensor array 20 and conductive strips 21a-b for providing an excitation signal to the finger of the user. Although not explicitly shown in FIG. 3b, the sensor component 19 also comprises a power supply interface and a communication interface.

The sensor array 20 comprises one or several lines of sensing elements, 12 (only one of the sensing elements has been indicated with a reference numeral to avoid cluttering the drawing), each being controllable to sense a distance between a sensing structure (top plate) comprised in the sensing element 12 and the surface of a finger contacting the top surface of the sensor array 20. In the enlarged portion of the sensor component 19 in FIG. 3b, a group 23 of sensing elements are marked 'S' for sensing. The sensor component 19 further comprises a separate reference sensing structure 25 arranged between conductive strip 21a and the sensor array 20. In contrast to what was described above for the touch sensor component 9, the reference sensing structure 25 of the swipe sensor component 19 in FIG. 3b is thus not formed by a group of sensing elements of the sensor array. The function is, however, the same and the dimensions may be similar.

The fingerprint sensor components 9, 19 in FIGS. 3a-b may advantageously be manufactured using CMOS technology, but other techniques and processes may also be feasible. For instance, an insulating substrate may be used and/or thin-film technology may be utilized for some or all process steps of the manufacturing process.

The functional configuration of the fingerprint sensing system 19 in FIG. 3b will now be described in more detail with reference to FIGS. 4a-b where a finger 29 is touching the surface of the fingerprint sensor component 19.

Figure 4A:
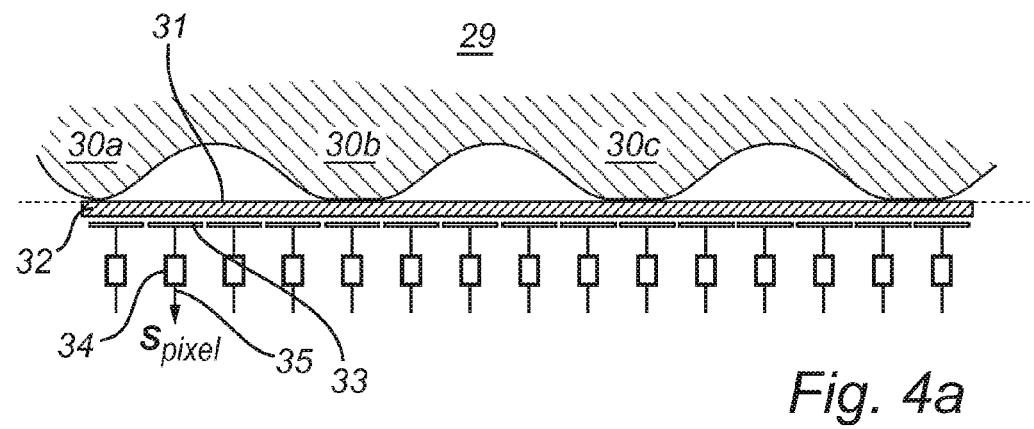
FIGS. 4a-b are schematic functional illustrations of the fingerprint sensing system in FIG. 3b where portions of the fingerprint sensor component and fingerprint ridges are shown in cross-section.
Figure 4B:
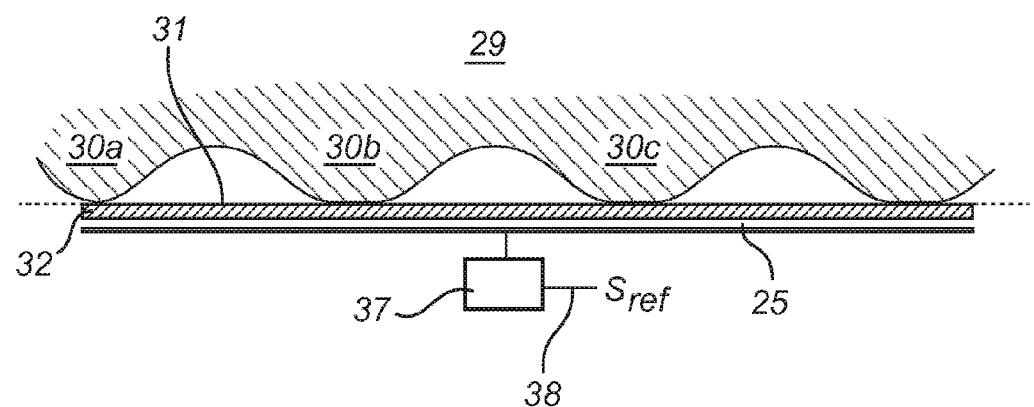

To aid the understanding of the reader, each of FIGS. 4a-b is a hybrid of a schematic cross-section view and a functional block diagram. FIG. 4a is a schematic cross-section through the sensing elements 12 along the line of sensing elements in FIG. 3b, and FIG. 4b is a schematic cross-section through and along the reference sensing structure 25 in FIG. 3b.

Referring first to FIG. 4a, a fingerprint surface comprising a plurality of friction ridges 30a-c contacts the top surface 31 of a dielectric layer 32 protecting the sensing structures 33 (only one of the sensing structures has been indicated with a reference numeral to avoid cluttering the drawing).

Connected to each of the sensing structures 33 is a corresponding sensing element circuit 34. As is indicated in FIG. 4a, each sensing element circuit 34 has an output 35 for providing a pixel signal $S_{pixel}$ indicative of the capacitive coupling between the corresponding sensing structure 33 and the finger 29. The capacitive coupling is an indication of the distance between the top surface 31 of the sensor 19 and the finger surface.

It should be noted that the description provided in connection with FIG. 4a is mainly intended to describe the basic configuration of the fingerprint sensor component 19 in FIG. 3b and an example relation between sensing structure 33 dimensions and the friction ridges 30a-c of a finger 29, and that the exact circuit and/or physical layout of each sensor element/pixel is not described in detail.

As will be appreciated by the skilled person, many different circuit layouts and/or physical layouts will be within the scope of the present invention. One example of a suitable pixel layout is provided in U.S. Pat. No. 7,864,992, which is hereby incorporated by reference in its entirety. One example sensing element configuration will be described further below with reference to FIGS. 10a-b.

Referring now to FIG. 4b, the reference sensing structure 25 is covered by the same dielectric protection layer 32 as the sensing structures 33 in FIG. 4a. As is schematically shown in FIG. 4b, the reference sensing structure 25 is connected to a reference sensing circuit 37 configured to provide, at its output 38, a reference signal $S_{ref}$ indicative of a change of a charge carried by the reference sensing structure 25. The change of charge is in turn indicative of the capacitive coupling between the reference sensing structure 25 and the finger 29.

Since several friction ridges 30a-c become arranged adjacent to the reference sensing structure 25 when the user places his/her finger on (swipes his/her finger across) the fingerprint sensor component 19, the reference signal $S_{ref}$ indicates an average capacitive coupling between the reference sensing structure 25 and the finger 29. The reference signal $S_{ref}$ can therefore advantageously be used as an indicator of the instantaneous signal acquisition conditions, including the electrical properties of the finger (wet/dry) and the level of interference, which may for example be caused by the common-mode noise described above with reference to FIG. 2.

A first embodiment of the method according to the present invention will now be described with reference to the flow-cart in FIG. 5 and the representative diagrams in FIGS. 6a-c. In a first step 101, the reference signal $S_{ref}$ and the pixel signal $S_{pixel}$ are sampled to provide the n:th sample $S_{ref,n}$ of the reference signal (the reference signal value) and the n:th sample $S_{pixel,n}$ of the pixel signal (the pixel signal value) at the n:th sampling time $t_n$. The respective samples may advantageously be acquired using so-called correlated double sampling, which may be used to remove any effects of the low frequency component of the common-mode noise (see FIG. 2). Correlated double sampling is, per se, well known to the skilled person, and correlated double sampling from sensing elements of a capacitive fingerprint sensor is described in detail in the above-mentioned document U.S. Pat. No. 7,864,992.

Figure 6A:
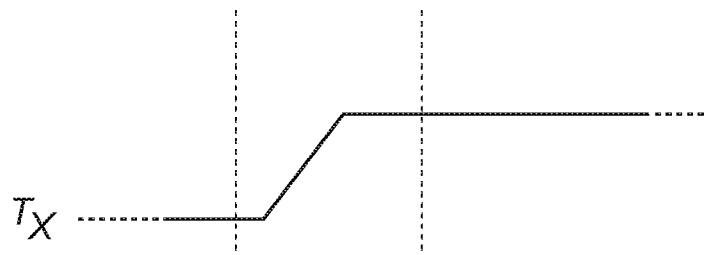
FIGS. 6a-c schematically illustrate steps of the method in FIG. 5.
Figure 6B:
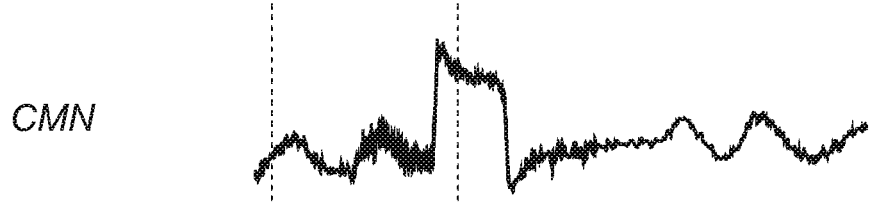
Figure 6C:
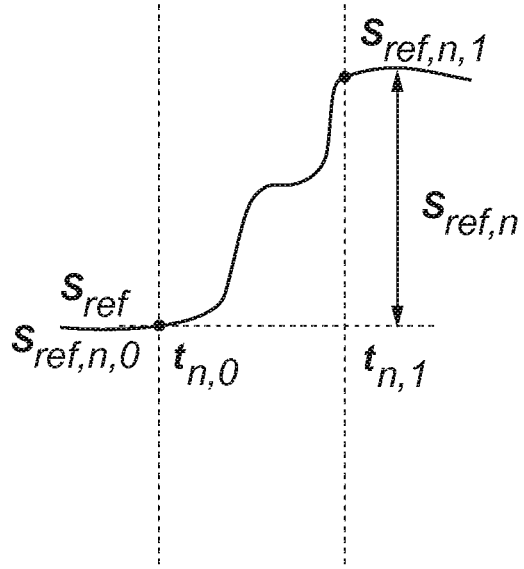

Referring now to FIGS. 6a-c, an exemplary sampling as carried out in the first step 101 will be described. FIG. 6a is an example of an excitation signal TX provided to the finger 29 of the user, for example using the conductive bezel 11 in FIG. 3a or the conductive strips 21a-b in FIG. 3b, FIG. 6b shows the potential of the user's finger 29, and FIG. 6c shows the reference signal $S_{ref}$.

Also indicated in FIGS. 6a-c are first $t_{n,0}$ and second $t_{n,1}$ sampling times for the correlated double-sampling and corresponding samples $S_{ref,n,0}$ and $S_{ref,n,1}$ of the reference signal $S_{ref}$.

Due to the common-mode noise (CMN) described above with reference to FIG. 2, the potential of the user's finger 29 will appear noisy as is schematically shown in FIG. 6b.

Because of the rapid potential changes of the high frequency component of the CMN, the finger potential may change substantially between the first $t_0$ and second $t_1$ sampling times for the correlated double-sampling, which may lead to a reference signal value $S_{ref,n}$ that is considerably stronger or weaker (in this case stronger) than would have been the case without any high frequency CMN (or other corresponding disturbance).

Figure 5:
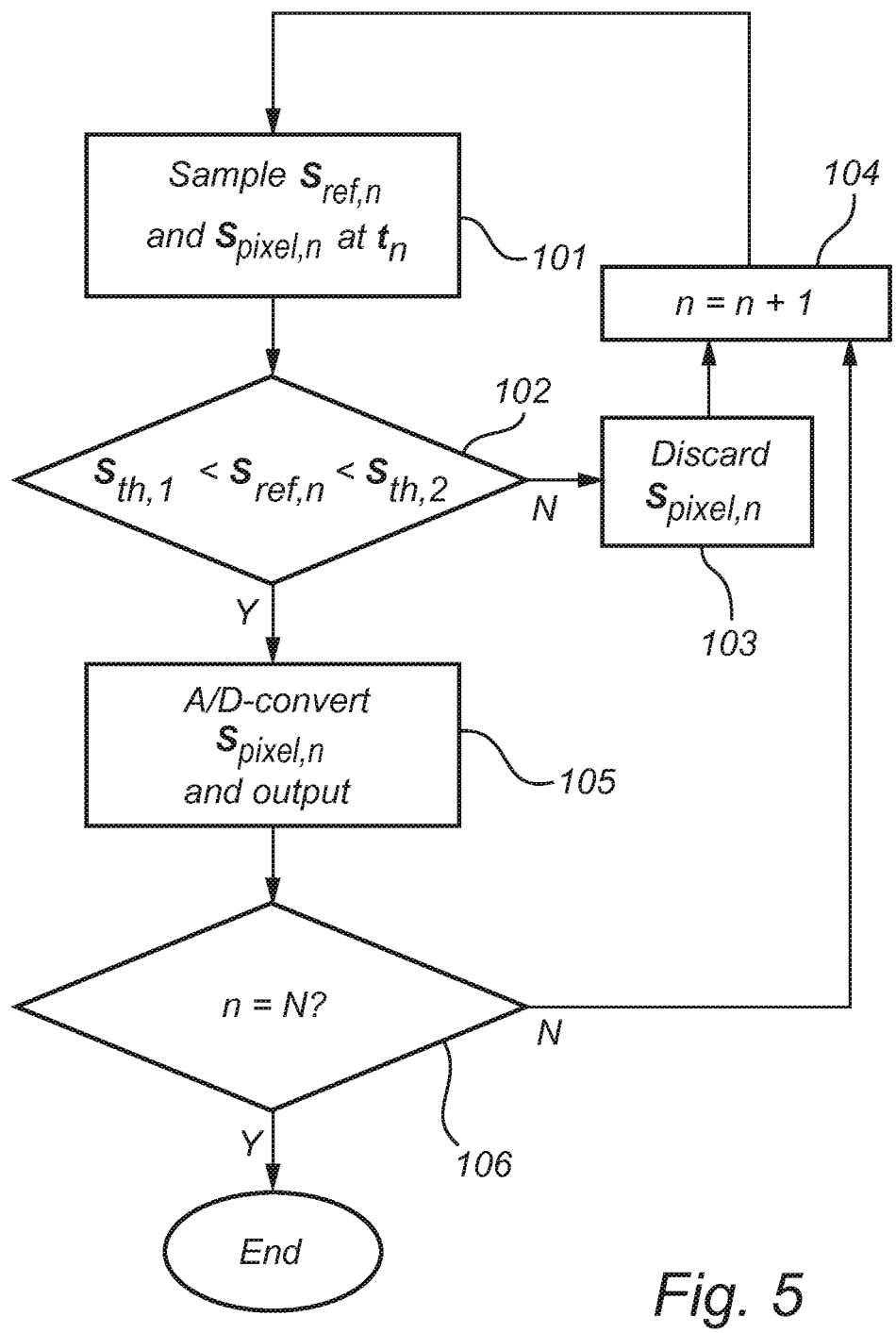
FIG. 5 is a flow-chart schematically illustrating a first embodiment of the method according to the present invention.

Returning to the flow-chart in FIG. 5, the sampled reference signal value $S_{ref,n}$ is, in step 102, is compared to a predetermined reference signal value range defined by a first, lower, threshold value $S_{th,1}$ and a second, higher, threshold value $S_{th,2}$.

If the sampled reference signal value $S_{ref,n}$ is outside the reference signal value range, as for the exemplary case illustrated in FIGS. 6a-c, then the method proceeds to discard, in step 103, the pixel signal value $S_{pixel,n}$ acquired at the same time as the evaluated reference signal value $S_{ref,n}$.

The method subsequently proceeds to increment a sample counter in step 104 and returns to the first step 101 to resample the reference signal $S_{ref}$ and the pixel signal $S_{pixel}$ from the same sensing element 33 at a later sampling time.

If the CMN situation is more favorable at the new sampling time, the reference signal value $S_{ref,n}$ may, in step 102, instead be determined to be within the reference signal value range, and the method instead proceeds to A/D-convert and outputs the pixel signal value $S_{pixel,n}$ in step 105.

It is thereafter determined in step 106 whether or not pixel signal values have been acquired from all sensing elements 33. If that is not the case, the method proceeds to step 104 to increment the sample counter and thereafter back to the first step 101. If all pixel signal values $S_{pixel,n}$ have been acquired, the fingerprint acquisition procedure has been completed.

Figure 7:
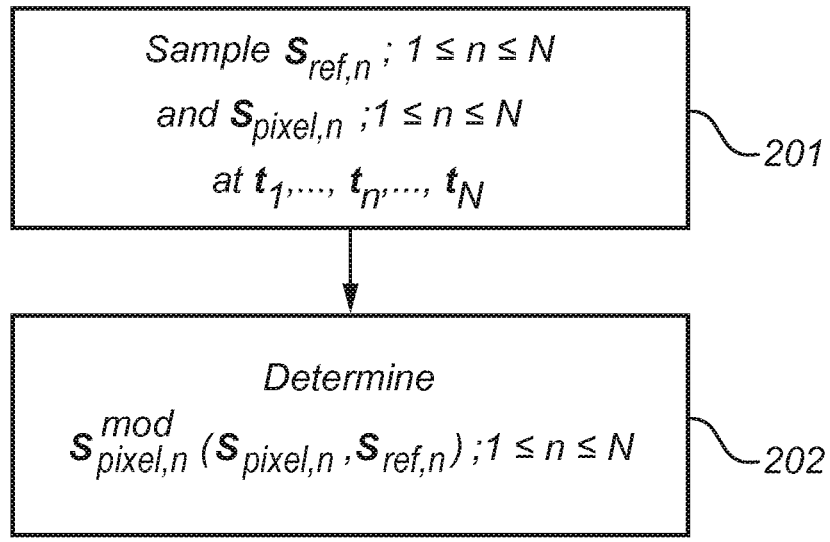
FIG. 7 is a flow-chart schematically illustrating a second embodiment of the method according to the present invention.

A second embodiment of the method according to the present invention will now be described with reference to the flow-cart in FIG. 7.

This second embodiment of the method according to the invention mainly differs from the above-described first embodiment in that a post-processing of the pixel signal values $S_{pixel,n}$ is carried out based on corresponding reference signal values $S_{ref,n}$.

Accordingly, in a first step 201, a series of reference signal values $S_{ref,n}$ and a corresponding series of pixel signal values $S_{pixel,n}$ are sampled at sampling times $t_1$-$t_N$. The sampling of each reference signal value/pixel signal value may be carried out as described above with reference to FIG. 5 and FIGS. 6a-c.

In the next step 202, a series of modified pixel signal values is determined based on the series of pixel signal values $S_{pixel,n}$ and the corresponding series of reference signal values $S_{ref,n}$.

Due to the averaging obtained using the reference sensing structure (14 in FIGS. 3a and 25 in FIG. 3b), reference signal values $S_{ref,n}$ can be used to modify pixel signal values $S_{pixel,n}$ acquired at the same acquisition time $t_n$. For instance, in the case illustrated in FIGS. 6a-c, the reference signal value $S_{ref,n}$ has been influenced by the CMN in FIG. 6b to be higher than it should be without CMN or with only low frequency CMN. Accordingly, the reference signal value $S_{ref,n}$ can be used to reduce the pixel signal value $S_{pixel,n}$ acquired at the same acquisition time $t_n$ to a modified pixel signal value, to compensate for the influence of the CMN in FIG. 6b.

Finally, a third embodiment of the method according to the present invention will now be described with reference to the flow-chart in FIG. 8 and the representative diagrams in FIGS. 9a-c.

Figure 8:
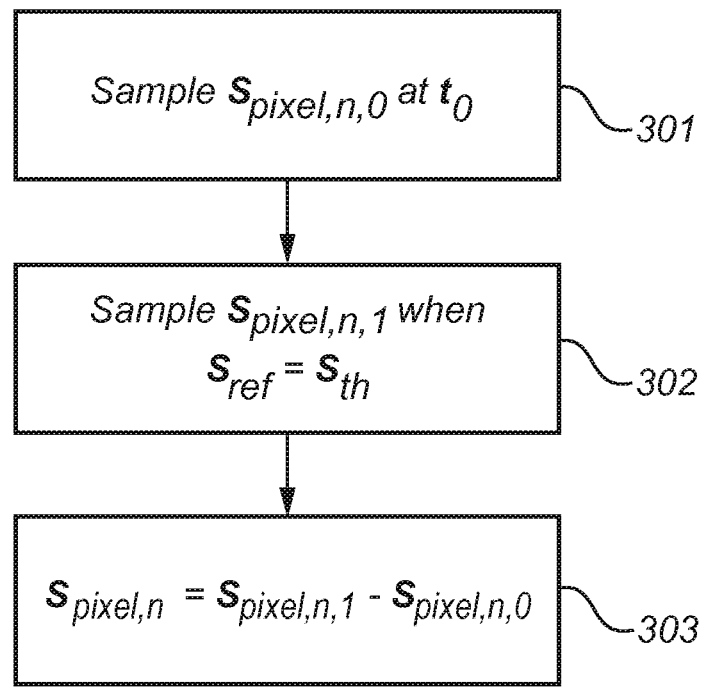
FIG. 8 is a flow-chart schematically illustrating a third embodiment of the method according to the present invention.

The flow-chart in FIG. 8 concerns the acquisition of a single pixel signal value (or the simultaneous acquisition of pixel signals from several sensing elements).

In a first step 301, the pixel signal $S_{pixel}$ is sampled at a first sampling time $t_{n,0}$ resulting in a first sample $S_{pixel,n,0}$. Subsequently, in step 302, the pixel signal is sampled at a second sampling time $t_{n,1}$ resulting in a second sample $S_{pixel,n,1}$. Rather than there being a fixed time difference between the first sampling time and the second sampling time, the second sampling time is dependent on the value of the reference signal $S_{ref}$.

Specifically, the reference signal $S_{ref}$ is compared with a threshold value $S_{ref,th}$, and when the reference signal reaches the threshold value, the second sample of the pixel signal is taken.

Figure 9A:
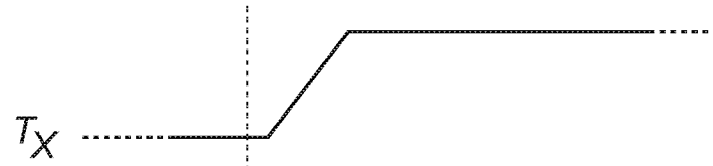
FIGS. 9a-c schematically illustrate steps of the method in FIG. 8.
Figure 9B:
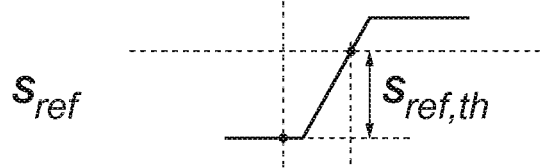
Figure 9C:
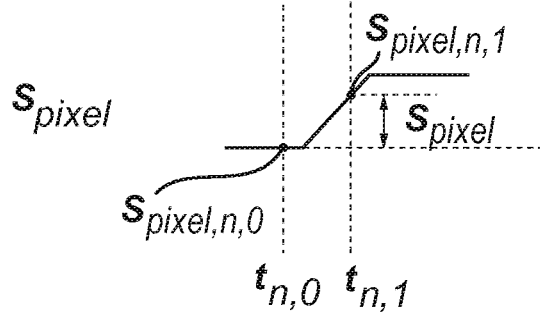

This is schematically illustrated in FIGS. 9a-c, where FIG. 9a is an example of an excitation signal TX provided to the finger 29 of the user, for example using the conductive bezel 11 in FIG. 3a or the conductive strips 21a-b in FIG. 3b, FIG. 9b shows the reference signal $S_{ref}$, and FIG. 9c shows the pixel signal $S_{pixel}$.

Also indicated in FIGS. 9a-c are the first $t_{n,0}$ and second $t_{n,1}$ sampling times for the correlated double-sampling, the threshold $S_{ref,th}$ for the reference signal $S_{ref}$ and the pixel signal value $S_{pixel,n}$.

As can be seen in FIG. 9c, the first sample $S_{pixel,n,0}$ of the pixel signal is taken at the first sampling time $t_{n,0}$. When the reference signal $S_{ref}$ has reached the threshold value $S_{ref,th}$, as shown in FIG. 9b, the second sample $S_{pixel,n,1}$ of the pixel signal $S_{pixel}$ is taken.

In step 303, the pixel signal value $S_{pixel,n}$ is then determined by taking the difference between the first sample and the second sample of the pixel signal.

In the embodiments described above, generally acquisition of a pixel signal from one sensing element at a time has been described. It should, however, be noted that pixel signals from several sensing elements may advantageously be acquired simultaneously.

An example configuration of the sensing elements 12 comprised in the fingerprint sensors 9, 19 in FIGS. 3a-b will now be described with reference to FIGS. 10a-b.

Figure 10A:
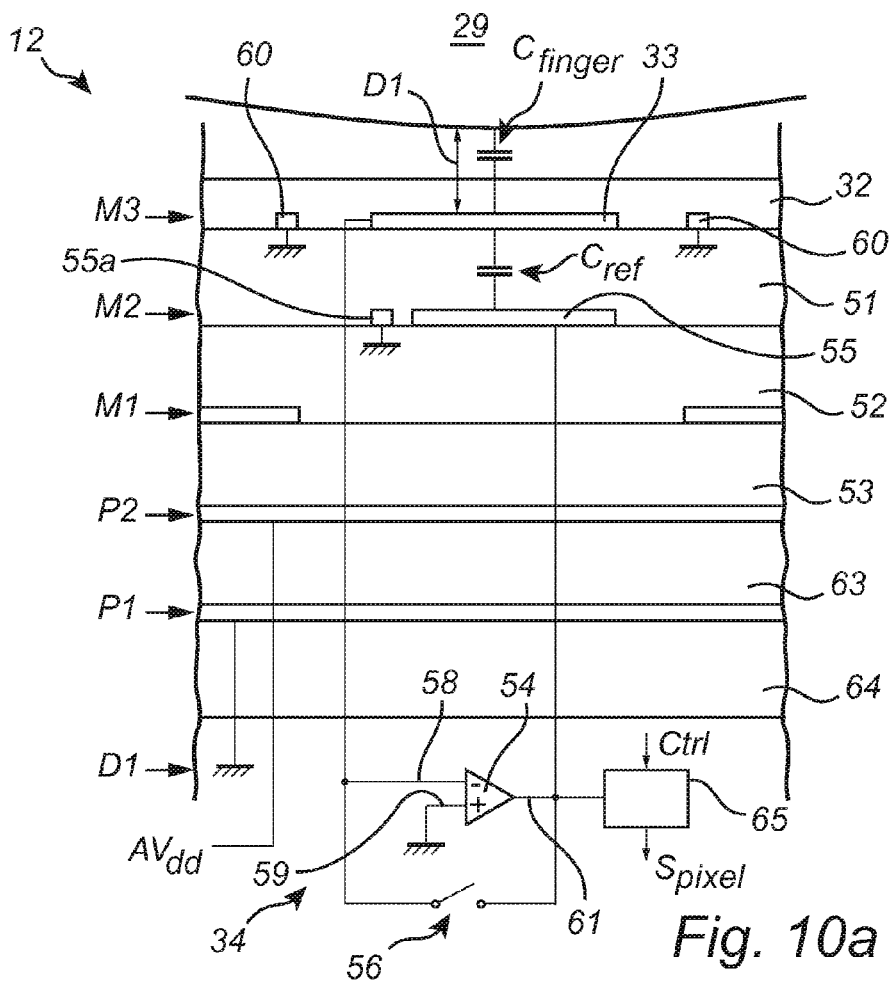
FIGS. 10a-b schematically illustrate example configurations of sensing elements comprised in embodiments of the fingerprint sensing system according to the present invention.

As can be seen in FIG. 10a, the sensing elements 12 are formed in a layer structure comprising three conductive layers; a conductive layer M3 at the top, a conductive layer M2 in the middle and a lower conductive layer M1, with first 51, second 52, and third 53 layers of an insulating dielectric material under the respective conductive layers M3, M2, M1. Examples of materials for the conductive layers are typically copper, aluminum and doped polycrystalline silicone. Examples of materials for the insulating layers are typically $SiO_2$, SiN, $SiNO_x$ and spin-on glass.

In addition, the layered structure used to form the sensing elements 12 may comprise a fourth layer P2 (second polysilicon) constituted by an electrically conducting layer which is kept at a certain analog voltage potential $AV_{dd}$. Further, there is a fifth layer P1 (first polysilicon) that is also constituted by an electrically conducting layer which is kept at ground potential, working as an electric shielding. Under each one of these layers P2, P1 there are fourth 63 and fifth 64 layers of an insulating dielectric material. In the bottom, there is a semi conductive substrate layer D1 comprising active components such as the charge amplifiers 54. The conductive layers P2, P1 as well as the lower conductive layer M1 described above, may for example be used for routing of electrical connections, resistors and electrical shielding. One of the conductive layers P2, P1 may also be used to form the lower electrode 55 of each sensing element 12 instead of the second metal layer M2.

The sensing element 12 shown in FIG. 10a comprises a sensing structure 33 formed in the top conductive layer M3. The sensing structure 33 is connected to a sensing element circuit 34 comprising a charge amplifier 54, a lower electrode 55, a reset switch 56, and sample-and-hold circuitry 65.

As can be seen in FIG. 10a, the sensing structure 33 is connected to the negative input terminal 58 of the charge amplifier 54. The positive input terminal 59 of the charge amplifier 54 is connected to ground. Hence, by means of the charge amplifier 54, the corresponding sensing structure 33 is virtually grounded, since the voltage over the input terminals 58, 59 of the charge amplifier 54 is almost zero.

Figure 10B:
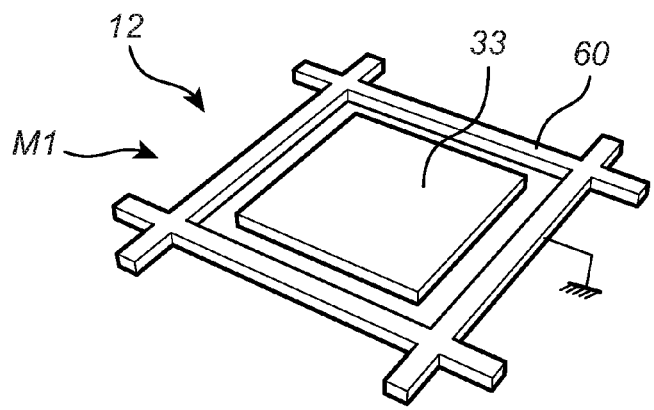

As can also be seen in FIG. 10b, each sensing structure 33 is surrounded by a shield frame 60 formed in the top conductive layer M3, where the shield frame 60 is connected to ground potential as a conductive shielding to prevent lateral parasitic capacitances between adjacent sensing structures 33, thus preventing so-called crosstalk between the sensing elements 21. The shield frame 60 may also be connected to another suitable controlled voltage potential.

Further, referring again to FIG. 10a, there is a protective dielectric layer 32 covering each of the sensing structures 33, to protect the sensing elements 12 from ESD (Electrostatic Discharge) and external wear. A finger 29 that comes into the vicinity of the upper surface of the protective layer 32 gives rise to a capacitance $C_{finger}$ between the finger 29 and the sensing structure 33.

As can be seen in FIG. 10a, the lower electrode 55 comprised in the sensing element circuit 34 is formed in the middle conductive layer M2. The lower electrode 55 is connected to an output terminal 61 of the charge amplifier 54. There is a feedback capacitance $C_{ref}$ formed between the sensing structure 33 and each lower electrode 55, which feedback capacitance $C_{ref}$ is connected between the negative input terminal 58 of the charge amplifier 54 and the output terminal 61.

An auxiliary lower electrode 55a is also formed in the middle conductive layer M2, adjacent to the lower electrode 55. The auxiliary lower electrode 55a is connected to ground and used as an extra shielding, since the lower electrode 55 may typically have a smaller area than the sensing structure 33.

The lower electrode 55 may be configured to achieve the desired gain for the sensor element circuit 34. In particular, the size of the lower electrode 55 may be suitably selected, since the gain depends on the feedback capacitance $C_{ref}$, which in turn is dependent on the physical dimensions of the sensing structure 33, the lower electrode 55, and the first insulating layer 51. The size of the auxiliary lower electrode 55a may be adjusted so as to fit beside the lower electrode 55.

As described above, an excitation signal TX (see for example FIGS. 6a-c and FIGS. 9a-c) may be provided to the finger 29. The provision of the excitation signal TX to the finger 29 results in a change of the charge carried by the sensing structures 33 (as well as the reference sensing structure 25 in embodiments where a separate reference sensing structure 25 is provided).

The change of charge that is carried by the sensing structure 33 is proportional to the capacitance $C_{finger}$ between the skin and the sensing structure 33. As the sensing structure 33 is virtually grounded, its charge is transferred by the charge amplifier 54 to the lower electrode 55. We may then calculate the voltage output from the charge amplifier 54 as:

$$U_{out} = (C_{finger}/C_{ref})U_{in}.$$

The output voltage $U_{out}$ is sampled by the sample-and-hold circuitry 65, preferably using correlated double-sampling as described further above to remove the low frequency component of the common mode noise.

The sample-and-hold circuitry 65 is controlled by a control signal and outputs the pixel signal $S_{pixel}$ indicative of the capacitive coupling between sensing structure 33 and finger 29 to an analog-to-digital converter (not shown).

The sample-and-hold circuitry 65, the analog-to-digital conversion and/or any post processing of pixel signals (analog or digital) may, according to embodiments of the present invention, be controlled based on the reference signal acquired from the reference sensing circuitry. For example, the control signal Ctrl to the sample-and-hold circuitry 65 may be dependent on the momentaneous value of the amplitude of the signal acquired from the reference sensing circuitry. Alternatively, there may be switching circuitry arranged between the sample-and-hold circuitry 65 and the analog-to-digital converter, and the switching circuitry may be controlled based on the reference signal from the reference sensing circuitry. If the reference signal has an amplitude that is lower or higher than a predetermined range, the pixel signal $S_{pixel}$ may be prevented from reaching the analog-to-digital converter.

The basic configuration of a reference sensing element (including a reference sensing structure and a reference sensing circuit) may advantageously be substantially the same as that described below for the sensing elements 12. Depending on the size of the reference sensing structure, the lower electrode may be configured to provide for a suitable signal strength. As mentioned further above, several sensing structures 33 may be used to together form a reference sensing structure. This may, for example, be achieved by combining the output signals corresponding to the selected sensing structures, or by providing controllable switching circuitry for mutually interconnecting selected sensing structures 33 and mutually interconnecting selected lower electrodes 55.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method of determining a representation of a fingerprint pattern of a finger using a fingerprint sensor comprising a plurality of sensing elements, the method comprising the steps of:
   acquiring a reference signal indicative of an electric coupling between a hand surface having friction ridges and a reference sensing structure configured in such a way that at least a portion of said reference sensing structure faces one of said friction ridges; and
   determining the representation of said fingerprint pattern based on said reference signal and a capacitive coupling between said finger and each of said sensing elements, wherein said step of determining comprises the steps of:
      acquiring pixel signals indicative of said capacitive coupling between said finger and each of said sensing elements using acquisition settings being dependent on said reference signal, and
      determining the representation of said fingerprint pattern based on said pixel signals, and
   wherein said step of acquiring said pixel signals comprises the steps of:
      sampling said reference signal at a sampling time, resulting in a reference signal value;
      sampling at least one pixel signal from at least one of said sensing elements at said sampling time, resulting in at least one pixel signal value; and
      resampling, when said reference signal value is outside a reference signal value range, said at least one pixel signal at a later sampling time.

2. The method according to claim 1, wherein said reference sensing structure is configured to extend across a plurality of said friction ridges.

3. The method according to claim 1, further comprising the step of:
   converting, when said reference signal value is inside said reference signal value range, said at least one pixel signal value from analog to digital.

4. A method of determining a representation of a fingerprint pattern of a finger using a fingerprint sensor comprising a plurality of sensing elements, the method comprising the steps of:
   acquiring a reference signal indicative of an electric coupling between a hand surface having friction ridges and a reference sensing structure configured in such a way that at least a portion of said reference sensing structure faces one of said friction ridges; and
   determining the representation of said fingerprint pattern based on said reference signal and a capacitive coupling between said finger and each of said sensing elements, wherein said step of determining comprises the steps of:
      acquiring pixel signals indicative of said capacitive coupling between said finger and each of said sensing elements using acquisition settings being dependent on said reference signal, and
      determining the representation of said fingerprint pattern based on said pixel signals, and
   wherein said step of acquiring said pixel signals comprises the steps of:
      sampling said reference signal at a series of sampling times, resulting in a series of reference signal values; and
      sampling said pixel signal at said series of sampling times, resulting in a series of pixel signal values,
      wherein said representation of said fingerprint pattern is determined based on said series of reference signal values and said series of pixel signal values.

5. The method according to claim 4, further comprising the step of:
modifying said series of pixel signal values using said series of reference signal values to provide a modified series of pixel signal values,
wherein said representation of said fingerprint pattern is determined based on said modified series of pixel signal values.

6. A method of determining a representation of a fingerprint pattern of a finger using a fingerprint sensor comprising a plurality of sensing elements, the method comprising the steps of:
acquiring a reference signal indicative of an electric coupling between a hand surface having friction ridges and a reference sensing structure configured in such a way that at least a portion of said reference sensing structure faces one of said friction ridges; and
determining the representation of said fingerprint pattern based on said reference signal and a capacitive coupling between said finger and each of said sensing elements,
wherein said step of determining comprises the steps of:
acquiring pixel signals indicative of said capacitive coupling between said finger and each of said sensing elements using acquisition settings being dependent on said reference signal, and
determining the representation of said fingerprint pattern based on said pixel signals, and
wherein said step of acquiring said pixel signals comprises the steps of:
evaluating said reference signal; and
sampling a pixel signal from each of said sensing elements using sampling timing being dependent on the evaluation of said reference signal.

7. The method according to claim 6, wherein said step of evaluating comprises the step of:
comparing said reference signal with a threshold value,
wherein said sampling timing is based on said comparison.

8. The method according to claim 7, wherein said step of sampling comprises the steps of:
performing a first sampling at a first sampling time; and
performing a second sampling at a second sampling time later than said first sampling time,
wherein a time period between said first sampling time and said second sampling time is determined based on said reference signal.

9. A fingerprint sensing system for determining a representation of a fingerprint pattern of a finger, said fingerprint sensing system comprising:

a plurality of sensing elements each being configured to capacitively couple to a finger arranged adjacent to said sensing element;
a reference sensing structure being configured in such a way that at least a portion of said reference sensing structure faces one of said friction ridges when a hand surface having said friction ridges is arranged adjacent to said reference sensing structure;
read-out circuitry connectable to said reference sensing structure and configured to acquire a reference signal indicative of an electric coupling between said hand surface and said reference sensing structure;
fingerprint determining circuitry configured to determine the representation of said fingerprint pattern based on said reference signal and a capacitive coupling between said finger and each of said sensing elements;
evaluation circuitry connected to said read-out circuitry and configured to evaluate at least one property of said reference signal; and
sampling circuitry connected to each of said sensing elements and to said evaluation circuitry, said sampling circuitry being configured to sample a pixel signal from each of said sensing elements using sampling timing being dependent on the evaluation of said reference signal.

10. The fingerprint sensing system according to claim 9, wherein said reference structure has a lateral extension of at least 200 µm.

11. The fingerprint sensing system according to claim 9, wherein said reference sensing structure comprises a plurality of said sensing elements.

12. An electronic device comprising;
a fingerprint verification arrangement comprising the fingerprint sensing system according to claim 9; and
processing circuitry configured to control said fingerprint verification arrangement to carry out a fingerprint verification of a user, and to perform at least one user-requested process only when said user is verified using said fingerprint verification arrangement.

13. The method according to claim 6, wherein said reference sensing structure is configured to extend across a plurality of said friction ridges.

14. The method according to claim 6, wherein said reference sensing structure is configured to extend across a plurality of said friction ridges.

* * * * *